(12) United States Patent
Shashidhar

(10) Patent No.: US 8,756,680 B2
(45) Date of Patent: Jun. 17, 2014

(54) BIOMETRIC-ENABLED SMART CARD

(75) Inventor: Nagaraja Shashidhar, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 145 days.

(21) Appl. No.: 13/559,929

(22) Filed: Jul. 27, 2012

(65) Prior Publication Data

US 2013/0036463 A1 Feb. 7, 2013

Related U.S. Application Data

(60) Provisional application No. 61/514,122, filed on Aug. 2, 2011.

(51) Int. Cl.
*G06Q 20/34* (2012.01)
*G06F 21/32* (2013.01)
*H04L 29/06* (2006.01)
*G07F 19/00* (2006.01)

(52) U.S. Cl.
CPC .............. *G06Q 20/341* (2013.01); *G06F 21/32* (2013.01); *H04L 63/08* (2013.01); *G07F 19/20* (2013.01)
USPC .............. 726/20; 713/186; 235/379; 382/115

(58) Field of Classification Search
CPC ..... G06Q 20/341; G07F 7/1008; G07F 21/34; G07F 21/32; G07F 19/20; H04L 63/08
See application file for complete search history.

(56) References Cited

U.S. PATENT DOCUMENTS

| | | | | |
|---|---|---|---|---|
| 5,997,977 A | * | 12/1999 | Zou et al. | 428/64.1 |
| 6,316,097 B1 | * | 11/2001 | Liu et al. | 428/332 |
| 7,142,091 B2 | * | 11/2006 | Lane | 340/5.83 |
| 7,617,528 B2 | * | 11/2009 | Hochfield et al. | 726/20 |
| 7,666,511 B2 | * | 2/2010 | Ellison et al. | 428/426 |
| 8,321,350 B2 | * | 11/2012 | Durst, Jr. | 705/51 |
| 2005/0212658 A1 | * | 9/2005 | Kinsella | 340/5.83 |
| 2006/0249951 A1 | * | 11/2006 | Cruikshank et al. | 283/92 |
| 2008/0040615 A1 | * | 2/2008 | Carper et al. | 713/186 |
| 2009/0142568 A1 | | 6/2009 | Dejneka et al. | |
| 2009/0215607 A1 | * | 8/2009 | Dejneka et al. | 501/27 |
| 2010/0312698 A1 | * | 12/2010 | Bonalle et al. | 705/41 |
| 2011/0240748 A1 | * | 10/2011 | Doughty et al. | 235/492 |

FOREIGN PATENT DOCUMENTS

| | | |
|---|---|---|
| FR | 2787610 A1 | 6/2000 |
| WO | 2004025545 A2 | 3/2004 |
| WO | 2004025545 A3 | 3/2004 |

OTHER PUBLICATIONS

U.S. Appl. No. 12/858,490 titled Crack and Scratch Resistant Glass and Enclosures Made Therefrom filed on Aug. 18, 2010.
U.S. Appl. No. 61/417,941 titled Ion Exchangable Glass With Deep Compressive Layer and High Damage Threshold filed Nov. 30, 2010.
U.S. Appl. No. 61/503,734 titled Ion Exchangeable Glass With High Compressive Stress filed on Jul. 1, 2011.

* cited by examiner

*Primary Examiner* — Fikremariam A Yalew
(74) *Attorney, Agent, or Firm* — Robert P. Santandrea

(57) ABSTRACT

A biometrics-enabled smart card for use in transactional or identity applications (e.g., credit cards and identity cards). The biometric smart card includes a substrate, a biometric sensor capable of reading biometric information through the substrate, and a microprocessor to process, store, and authenticate biometric information. The substrate has a Young's modulus of at least abut 50 GPa and a thickness of up to about 0.5 mm.

31 Claims, 2 Drawing Sheets

BIOMETRIC-ENABLED SMART CARD

CROSS-REFERENCE TO RELATED APPLICATIONS

This application claims the benefit of priority under 35 U.S.C. §119 of U.S. Provisional Application Ser. No. 61/514,122 filed on Aug. 2, 2011, the content of which is relied upon and incorporated herein by reference in its entirety.

BACKGROUND

The disclosure relates to refers to digitally encoded cards. More particularly, the disclosure relates to digitally encoded cards that are capable of scanning and storing biometric information.

Digitally encoded or "smart" cards are currently used in a variety of applications ranging from telephone calling, electronic cash payments, user identification, and the like. Like non-encoded cards, however, such smart cards are susceptible to theft and fraud, due to the fact that authenticating data for these cards is stored in systems or repositories that are accessible to others through hacking.

While biometric information is effective in confirming or establishing the identity of a user, its use is limited due to the lack of infrastructure needed to process such applications. In addition, smart cards are currently made of flexible (i.e., low modulus) plastic materials. Such flexibility allows the card to be bent, causing damage to internal sensors or microprocessors.

SUMMARY

The present disclosure meets these and other needs by providing a biometrics-enabled smart card for use in transactional or identity applications (e.g., credit cards, identity cards, and the like). The biometric smart card comprises a substrate having a Young's modulus of at least 50 GPa and, in some embodiments, at least 60 GPa, and a thickness of up to about 0.5 mm, a biometric sensor capable of reading biometric information through the substrate, and a microprocessor to process, store, and authenticate biometric information. In some embodiments, the substrate is a transparent substrate such as, but not limited to, a glass substrate.

Accordingly, one aspect of the disclosure is to provide a biometric smart card for biometric identification or authorization of a user. The biometric smart card comprises: a substrate that is transparent to biometric information and has a Young's modulus of at least 50 GPa and, in some embodiments, at least 60 GPa, and a thickness of up to about 0.5 mm, wherein the transparent substrate forms a first outer surface of the biometric smart card; a protective cover forming a second outer surface of the biometric smart card opposite the first surface; a biometric sensor, wherein the biometric sensor is disposed between is disposed flush with the first outer surface or between the first outer surface and the protective cover and adjacent to the substrate such that the biometric sensor receives the biometric information through the transparent substrate; a microprocessor in communication with the biometric sensor, wherein the microprocessor is disposed between the substrate and the protective cover, and wherein the microprocessor authenticates or identifies the user based upon the biometric information received by the biometric sensor; and a power management system in communication with the biometric sensor and the microprocessor, wherein the power management system provides power to the biometric sensor and the microprocessor.

A second aspect of the disclosure is to provide a transparent glass substrate for a smart card. The transparent glass substrate having a Young's modulus of at least 50 GPa and, in some embodiments, at least 60 GPa, and a thickness of up to about 0.5 mm, wherein the transparent glass substrate is transparent to biometric information.

A third aspect of the disclosure is to provide a biometric smart card for biometric identification or authorization of a user. The biometric smart card comprises: a transparent substrate, wherein the transparent substrate is transparent to biometric information and has a Young's modulus of at least 50 GPa and, in some embodiments, at least 60 GPa, and a thickness of up to about 0.5 mm, and wherein the transparent substrate forms a first outer surface of the biometric smart card; a protective cover, the protective cover forming a second outer surface of the biometric smart card opposite the first surface; a biometric sensor, wherein the biometric sensor is disposed flush to the first outer surface or between the first outer surface and the protective cover and adjacent to the transparent substrate such that the biometric sensor receives the biometric information through the substrate; a microprocessor in communication with the biometric sensor, wherein the microprocessor is disposed between the transparent substrate and the protective cover, and wherein the microprocessor authenticates or identifies the user based upon the biometric information received by the biometric sensor; and a power management system in communication with the biometric sensor and the microprocessor, wherein the power management system provides power to the biometric sensor and the microprocessor.

A fourth aspect of the disclosure it to provide a method of using a smart card. The method comprises: providing the smart card, wherein the smart card comprises: a substrate, wherein the substrate is transparent to biometric information and forms a first outer surface of the smart card, and wherein the substrate has a Young's modulus of at least 50 GPa and, in some embodiments, at least 60 GPa, and a thickness of up to about 0.5 mm; a protective cover, the protective cover forming a second outer surface of the smart card opposite the first outer surface; a biometric sensor disposed flush with the first outer surface or between the first outer surface and the protective cover such that the biometric sensor receives the biometric information through the substrate; and a microprocessor in communication with the biometric sensor and disposed between the substrate and the protective cover. The method also comprises scanning the biometric information with the biometric sensor; and comparing the scanned biometric information with biometric information stored in the microprocessor.

These and other aspects, advantages, and salient features will become apparent from the following detailed description, the accompanying drawings, and the appended claims.

DETAILED DESCRIPTION

Figure 1:
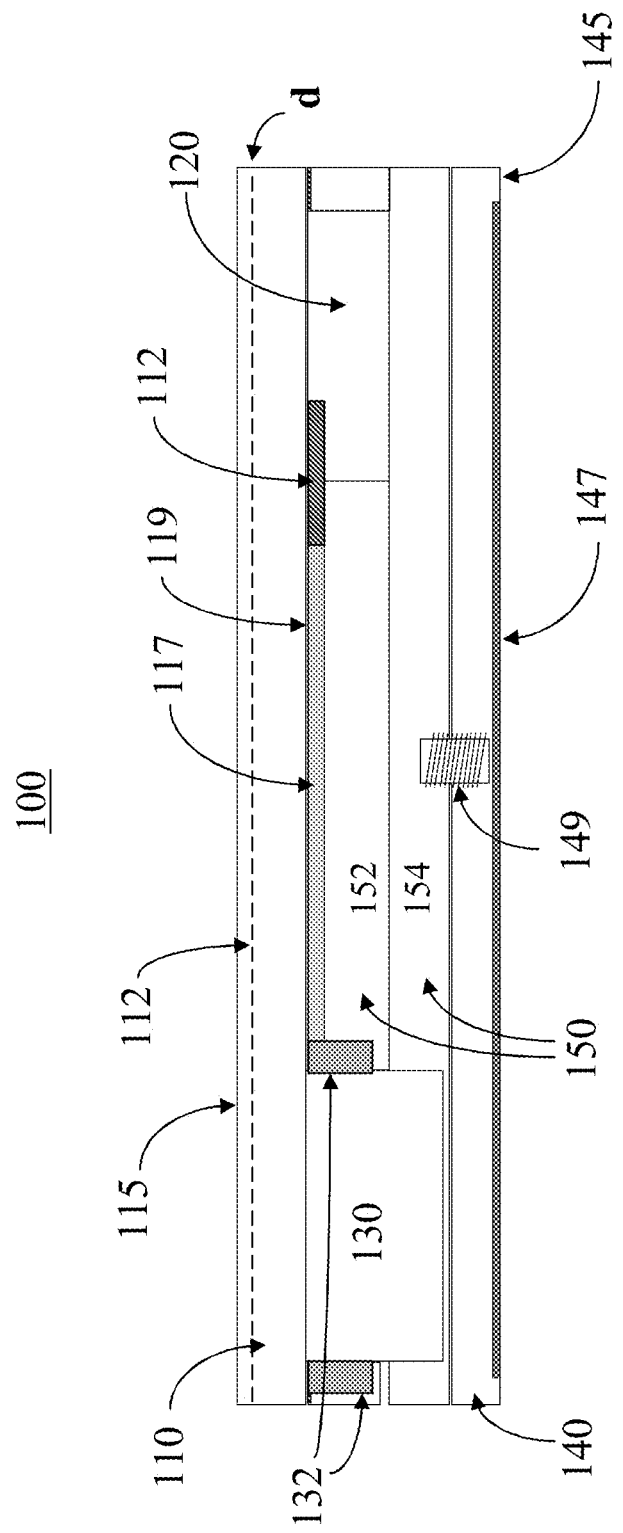
FIG. 1 is a schematic cross-sectional view of an embodiment of a biometric smart card.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the term "smart card" refers to a digitally encoded card having a built-in microprocessor that can be loaded with data. Such smart cards may enable a user to conduct transactions such as purchasing goods, services, or the like, gain access to restricted areas or information, and/or other such functions.

As used herein, the term "biometric" refers to the measurement and analysis of biological data such as fingerprints, iris patterns, voice patterns, facial patterns, hand measurements, and the like for authentication purposes.

Identification and credit cards that are currently in use are typically made of flexible (i.e., low modulus) plastic materials. Such cards are often bent during use—for example, when carried in a purse or a wallet—resulting in damage to any internal sensors or microprocessors. Consequently, smart cards are generally made of stiffer material and are therefore thicker than regular plastic credit or identity cards. The increased thickness in many instances makes these smart cards unusable with interfaces (e.g., card readers that require a swiping motion) employed in many systems.

In particular, fingerprint and iris-based pattern recognition are among the biometric technologies that are currently used for user identification means. Fingerprints, for example, may be detected, sensed, or "read" using active capacitance sensors or by visual methods. A CMOS or CCD chip and a light source are presently needed for visual sensing of fingerprint and iris patterns. Both the capacitance and the visual sensing require a substrate that is transparent. The plastic materials that are currently used in credit and/or smart card applications, however, are not transparent.

Accordingly, a biometric smart card (also referred to herein as a "smart card") is provided. A schematic cross-sectional view of one embodiment of a biometric smart card is shown in FIG. 1. The biometric smart card 100 comprises a substrate 110, a microprocessor 120, a biometric sensor 130, and a power management system 150.

Substrate 110 forms a first outer surface 115 of smart card 100 is transparent to biometric information. "Transparent to biometric information" means that biometric information may pass or be transmitted through substrate 110 by, for example, providing substrate 110 with an aperture or a transparent window through which such information may be transmitted. Substrate 110 is sufficiently thin and strong to protect the internal contents of smart card 100. Substrate 110 has a Young's modulus of at least 50 GPa and, in some embodiments, at least 60 GPa. In some embodiments, substrate has a thickness of up to about 0.5 mm. In particular embodiments, transparent substrate 110 has a thickness of about 0.4 mm.

Substrate 110 may comprise, consist essentially of, or consist of a metal, an alloy, a composite material, a transparent material such as a glass or plastic, and combinations thereof. In some embodiments, substrate 110 is a glass such as, but not limited to, a soda lime glass, a borosilicate glass, an alkali aluminosilicate glass, an alkali aluminoborosilicate glass, or the like. The glass may be strengthened, either thermally, chemically, or by combinations of thermal and chemical treatments. The strengthened glass has at least one layer 112 under compressive stress (compressive layer). Compressive layer 112 extends from surface 115 to a depth d (depth of layer) below surface 112. In some embodiments, the compressive stress is at least about 300 MPa, and the depth of layer is at least about 10 μm.

In some embodiments, substrate 110 is transparent and further includes indicia 117 (e.g., graphics or logos) printed on at least a portion of a second or inner surface 119 of the transparent substrate. Such indicia may be applied by those means known in the art such as screen printing, ink-jet printing, or the like.

Protective cover 140 forms a second outer surface 145 of biometric smart card 100 opposite first outer surface 115, which is formed by transparent 110. Protective cover 140 may, in some embodiments, be a plastic sheet comprising those plastic materials that are currently used in credit card or identity card applications. In some embodiments, protective cover 140 may typically have a thickness of about 0.2 mm.

Biometric sensor 130, in some embodiments, may comprise at least one of a visual sensor, a capacitive sensor, a radio frequency-based sensor, or combinations thereof that are capable of recognizing biometric information representative of a user of the biometric smart card 100. As previously described herein, such information may include, but is not necessarily limited to, patterns present in the fingerprints or iris of a user. A CMOS or CCD chip and, in some embodiments, a light source are presently needed for visual sensing of fingerprint and iris patterns. Alternatively, the biometric information may include voice patterns, facial patterns, hand measurements, and the like.

Both capacitance and visual sensing require the biometric information be visible to or viewable by biometric sensor 130. In one embodiment, visibility/viewability is accomplished by using a substrate 110 that is transparent. Accordingly, biometric sensor 130 is disposed within the smart card such that biometric information is detectable by biometric sensor 130 through transparent substrate 110. In some embodiments, a light source 132 is disposed adjacent or within biometric sensor 120 to enable or enhance visual reading of biometric information. In one non-limiting example, light source 132 illuminates a finger print or iris. The presence of light source 132 is particularly advantageous in those embodiments where biometric sensor 130 is a CMOS-based sensor. In other embodiments, biometric sensor 130 is disposed flush with first outer surface 115 or slightly below first outer surface and within an aperture formed in substrate 100; i.e., between first outer surface 115 and protective cover 140.

Microprocessor 120 is disposed within biometric smart card 100 and between substrate 110 and protective cover 140. Microprocessor is in communication with biometric sensor 110 and power management system 150. Microprocessor 120 captures and stores the user's biometric signature, compares the captured biometric signature to the user's stored signature, authenticates the user's biometric signature, and, when the user's biometric signature is authenticated, enables biometric smart card 100 to be used. In some embodiments, microprocessor 120 enables such use for a limited or predetermined time. Microprocessor 120 may also include other features that enhance the security of biometric smart card 100, such as microprocessor-created code that can be used as verification means for telephonic and online transactions.

In some embodiments, the biometric smart card described herein is self-authenticating; i.e., a user's captured biometric signature is authenticated within the smart card without resorting to an external system that is accessible to others. This protects the privacy of the user, as sensitive biometric information is stored only within the card. There is also no way to extract the biometric or other information from the microprocessor. When the biometric smart card is damaged, the card may be destroyed by bending. Such bending will cause the transparent glass substrate glass to shatter and damage the microprocessor and the biometric sensor, thus rendering the card unusable and the information stored within the microprocessor un-extractable.

Biometric smart card 100 further comprises a power management system 150 that is in communication and provides power to biometric sensor 110, microprocessor 120, and, when present, other components (e.g., light source 132) that require electrical power. In some embodiments, power management system 150 includes a power source 152 and an energy storage device 154. In some embodiments, at least a portion of power management system 150 is located or disposed within biometric smart card 100 and between substrate 110 and protective cover 120. In some embodiments, power source 150 is contained entirely within biometric smart card 110 and between substrate 110 and protective cover 120. Power source 150 may comprise one of a radiofrequency power source, an inductive layer, and a photoelectric layer. In other embodiments, the power source is external to biometric smart card 100, and may comprise a power mat, a charger, or the like that is in communication with biometric smart card 100 and, in particular, with energy storage device 154.

In some embodiments, energy storage device 154 comprises at least one of a battery and a capacitor. In those instances where energy storage device 154 comprises a battery, the battery may be rechargeable. In one non-limiting example, energy storage device 154 comprises a paper battery: a flexible, ultra-thin energy storage and production device formed by combining carbon nanotubes with a conventional sheet of cellulose-based paper. Such a paper battery acts as both a high-energy battery and supercapacitor, combining two components that are separate in traditional electronics, allowing the battery to provide both long-term, steady power production and bursts of energy.

In some embodiments, biometric smart card 100 also includes a reader interface that enables transfer of data from microprocessor 120 to an external data processor or data storage unit. In some embodiments, the reader interface comprises a magnetic strip 147 disposed on outer surface protective cover 140. Magnetic strip 147 enables biometric smart card 100 to be based on or communicate with external processors or data storage units that employ magnetic strip technology and thus allows biometric smart card 100 to be compatible with legacy systems. In the case of magnetic strip technology, biometric smart card 100 includes an activator 149 that allows the magnetic information to be read by an external device. The activator 149 essentially scrambles the information on the magnetic strip 147 to be "unreadable" unless the user is authenticated. When the user is authenticated, activator 149 will allow smart card to be "read" by an external system for a short time—such as, for example, 30 seconds—after which the information contained in the smart card 100 is re-scrambled and made unreadable. Alternatively, the reader interface may comprise wireless interface such as, for example, a radio frequency communicator.

Figure 2:
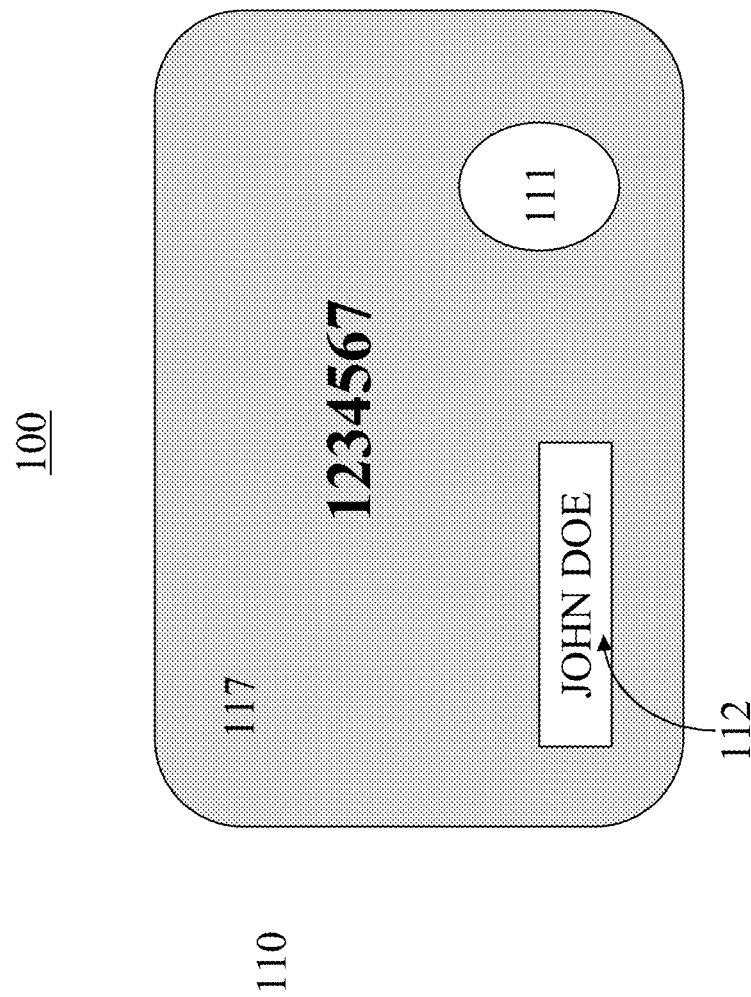
FIG. 2 is a schematic front view of a biometric smart card.

A schematic front view of the biometric smart card described herein is shown in FIG. 2. In some embodiments, a display 112 is disposed under—and readable through—transparent substrate 110 (FIG. 1). Display 112 may, for example, be used to display an authentication number or code or a user name. Display 112 may be a passive display that is capable of operating with very little power, as power is required only to change the display and not to maintain a pattern on the display.

In those embodiments in which substrate 110 comprises a transparent material, indicia 117 may be deposited on second surface 119 of transparent substrate 110 and is visible through transparent substrate 110. In those embodiments in which substrate 110 is not transparent, indicia 117 may be deposited or otherwise formed on outer surface 115 by means (printing, engraving, films, decals, etc.) that are appropriate to the material comprising substrate 110. Indicia 117 may contain some indentifying marks such as, for example, a numerical code, as shown in FIG. 2. Transparent aperture 111 is transparent to capacitance or light and allows biometric information to be sensed by biometric sensor 130.

In those embodiments in which the biometric information to be sensed is a fingerprint, a finger is placed or swiped over transparent aperture 111, and biometric sensor 130 scans, detects, senses, and/or "reads" the fingerprint. In those embodiments in which the biometric information to be read or scanned is present in the iris, the scanning operation depends upon the scanning system and the optics used for biometric sensor 130. In some embodiments, the user removes any glasses and stares at transparent aperture 111 while moving biometric smart card 100 towards the user's face. Once the biometric smart card is still, the biometric sensor 130, which may be visual detection means (e.g., a camera), scans the user's iris.

In one particular aspect, the biometric smart card described hereinabove comprises a transparent substrate that is transparent to biometric information and forms the first outer surface of the biometric smart card. The transparent substrate has a Young's modulus of at least 50 GPa and, in some embodiments, at least 60 GPa, and a thickness of up to about 0.5 mm. The biometric smart card further comprises: a protective cover that forms a second outer surface of the biometric smart card opposite the first surface; a biometric sensor that is disposed flush to the first outer surface or between the first outer surface and the protective cover and adjacent to the transparent substrate such that the biometric sensor receives the biometric information through the substrate; a microprocessor in communication with the biometric sensor and disposed between the transparent substrate and the protective cover, wherein the microprocessor authenticates or identifies the user based upon the biometric information received by the biometric sensor; and a power management system in communication with the biometric sensor and the microprocessor, wherein the power management system provides power to the biometric sensor and the microprocessor. The protective cover, biometric sensor, microprocessor, and power management system of the biometric smart card have all been described hereinabove.

In another aspect, a transparent glass substrate, such as that described hereinabove, is also provided. As previously described herein, the transparent glass substrate is sufficiently thin and strong to protect the internal contents of a smart card and has a Young's modulus of at least 50 GPa and, in some embodiments, at least 60 GPa. The transparent glass substrate is transparent to a capacitance signal and/or optical signals and may, in some embodiments, have a thickness of up to about 0.5 mm and, in other embodiments, transparent substrate 110 has a thickness of about 0.4 mm.

In some embodiments, the transparent glass substrate is a glass such as, but not limited to, a soda lime glass, a borosilicate glass, an alkali aluminosilicate glass, an alkali aluminoborosilicate glass, or the like. Non-limiting examples of such glasses include those described in U.S. Pat. No. 7,666,511 (describing an alkali aluminosilicate glass comprising: 64 mol %≤$SiO_2$≤68 mol %; 12 mol %≤$Na_2O$≤16 mol %; 8 mol %≤$Al_2O_3$≤12 mol %; 0 mol %≤$B_2O_3$≤3 mol %; 2 mol %≤$K_2O$≤5 mol %; 4 mol %≤$MgO$≤6 mol %; and 0 mol %≤$CaO$≤5 mol %, wherein: 66 mol %≤$SiO_2+B_2O_3+CaO$≤69 mol %; $Na_2O+K_2O+B_2O_3+MgO+CaO+SrO$>10 mol %; 5 mol %≤$MgO+CaO+SrO$≤8 mol %; $(Na_2O+B_2O_3)-Al_2O_3$≤2 mol %; 2 mol %≤$Na_2O-Al_2O_3$≤6 mol %; and 4 mol %≤$(Na_2O+K_2O)-Al_2O_3$≤10 mol %, and wherein the glass has a liquidus viscosity of at least 130 kpoise); U.S. Published Patent Application 2009/0215607 A1 (describing an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % $MgO$; 0-10 mol % $CaO$; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≤$Li_2O+Na_2O+K_2O$ ≤20 mol % and 0 mol %≤$MgO+CaO$≤10 mol %, and wherein the silicate glass is substantially free of lithium); U.S. Published Patent Application 2009/0142568 A1 (describing an alkali aluminosilicate glass comprising at least one of alumina and boron oxide and at least one of an alkali metal oxide and an alkaline earth metal oxide, wherein −15 mol % ≤$(R_2O+R'O-Al_2O_3-ZrO_2)-B_2O_3$≤4 mol %, where R is one of Li, Na, K, Rb, and Cs, and R' is one of Mg, Ca, Sr, and Ba); U.S. patent application Ser. No. 12/858,490 (describing an aluminoborosilicate glass comprising at least 50 mol % $SiO_2$ and at least one modifier selected from the group consisting of alkali metal oxides and alkaline earth metal oxides, wherein the aluminoborosilicate glass is ion exchangeable, and wherein a ratio $$\left[\frac{Al_2O_3(mol\ \%) + B_2O_3(mol\ \%)}{\sum modifiers(mol\ \%)} > 1\right];$$

U.S. Provisional Patent Application No. 61/417,941 (describing a glass comprising $SiO_2$, $Al_2O_3$, $P_2O_5$, and at least one alkali metal oxide ($R_2O$), wherein 0.75≤$[(P_2O_5(mol\ \%)+R_2O(mol\ \%))/M_2O_3(mol\ \%)]$≤1.2, where $M_2O_3=Al_2O_3+B_2O_3$); and U.S. Provisional Patent Application No. 61/503,734 (describing a glass having a surface and a layer under compressive stress extending from the surface to a depth of layer, wherein the compressive stress is at least about 900 MPa and the depth of layer is at least about 30 μm, and wherein the glass article comprises at least about 50 mol % $SiO_2$ and at least about 11 mol % $Na_2O$), the contents of which are incorporated by reference herein in their entirety.

The glass may be strengthened by combinations of thermal and chemical treatments such as thermal tempering, ion exchange, or the like, or by combinations of such chemical and/or thermal treatments. The strengthened glass has at least one layer under compressive stress (compressive layer) that extends from a surface of the transparent substrate to a depth (depth of layer) below the surface. In some embodiments, the compressive stress is at least about 300 MPa, and the depth of layer is at least about 10 μm.

In another aspect, a method of using a biometric smart card, such as those described herein, is provided. In a first step, the biometric smart card, such as those previously described hereinabove, is provided. The smart card comprises: a substrate having a Young's modulus of at least 50 GPa and a thickness of up to about 0.5 nun; a protective cover; a biometric sensor disposed either flush with the first outer surface or between the first outer surface and the protective cover; a microprocessor disposed between the substrate and the protective cover and in communication with the biometric sensor; and a power system in communication with the biometric sensor and the microprocessor, wherein the power management system provides power to the biometric sensor and the microprocessor.

The method further comprises a second step in which biometric information is scanned by the biometric sensor. The scanned biometric information is compared to biometric information stored in the microprocessor. In some embodiments, the method further includes either authorizing or denying authorization of a transaction based upon the comparison of scanned biometric data and stored biometric data. Such transactions may include, but are not limited to, the purchase of goods or services, gaining access/entry to restricted data and/or areas, or the like. Generally, authorizing occurs when the scanned data matched the stored data. Conversely, denying authorization occurs when the scanned biometric data does not match the stored biometric data.

In some embodiments, the biometric smart card described hereinabove card may be used online for internet or computer network transactions or for telephonic transactions. In these instances, the microprocessor generates a numerical code that is transmitted to an external source (e.g., a credit card company) via an offline authorization system, a card reader, or the like. For example, a card reader such as "USBswipe" may be installed on a computer. The numerical code is generated by the microprocessor using an algorithm. The algorithm uses data such as a credit card number, account number, identification number, time and date, transaction date, or the like to uniquely verify the identity of the biometric smart card holder and when the smart card is used.

The numeric code may, in some embodiments, have a validity that is time-sensitive—e.g., the code is valid for one hour—after which time the smart card becomes inactive In some embodiments, such a time-sensitive numeric code may be generated, for example by an offline authorization system (OAS) described herein below. This numeric code can also be generated by an external source or issuing entity (e.g., a credit card company), which can then compare with the code sent by a third party (e.g., a vendor). If the codes match, the transaction is verified. The algorithm may be established upon activation of the smart card and/or changed to accommodate various security levels by the issuing entity.

In one non-limiting example, the biometric smart card may be used with either a legacy (e.g., a magnetic card reader) system or via a telephonic or computer transaction. The smart card is first energized charging by placing the card on a charger (e.g., for about 10 seconds) prior to conducting the transaction. The user scans the biometric information into the smart card, which then compares the scanned biometric information to biometric information stored in the card and authorizes the card and/or transaction. In some embodiments, authorization may occur when the activator (149 in FIG. 1) enables the magnetic strip (147 in FIG. 1) to be active so that it can be scanned by a card reader/interface. In other embodiments, a time-sensitive numeric code that is active for a longer time is generated. Such a time-sensitive numeric code may be generated, for example by an offline authorization system (OAS) described herein below. This numeric code is displayed in the passive display (112 in FIG. 1), which can be entered in an offline system such as a computer, telephone, or the like for authorization by the entity issuing the smart card.

As mentioned hereinabove, an offline authorization system (OAS) may generate a time-sensitive numeric code for the biometric smart card. The OAS comprises a series of algorithms that generates a 5- or 6-digit off-line authorization code (OAC) that depends on data such as, but not limited to a credit card or identification number, time, date, and algorithm number. The OAC may also be date and time dependent such that the authorization is active for a pre-assigned period of time. The OAS may be designed into the system such that authorization is given only when the codes generated by the smart card and the system are generated within a pre-defined time period, e.g., one hour.

The authorization system requires that a database containing a few thousand algorithms be used. The algorithm can be as simple as, for example, (NNNNNNNN+YYYYMMDD+ MMMMHHHH), where NNNNNNNN is the last eight digits of a credit card number, YYYYMMDD is the date in year-month-day format, and HHMM are the hour-minute in 24 hour format. The last six digits of the result may be displayed in the passive display (112 in FIG. 2) of the biometric smart card. When the user submits this number for authorization, the system also generates an off-line authorization code based on the same inputs. If the OACs match, the transaction is authorized. Security for the transaction is provided by the fact that several thousands of algorithms are used at any given time and that the smart card will not generate an OAC without biometric authentication. The biometric smart card 100 is randomly assigned an algorithm number and that specific algorithm is coded in the microprocessor 120 and the authorization system knows the algorithm code. The probability that two cards will use the same algorithm is therefore low. The algorithms used can be more sophisticated than the one illustrated above.

The biometric smart card described herein may be activated upon issuance; i.e., data that will enable self-authentication during use must be stored in microprocessor 120, in some instances by the issuing organization or entity. This data may include identity data (e.g., credit card or other identification number), an authorization algorithm, or the like. At this point the microprocessor is ready to scan the identity biometric. Upon receipt of the smart card the user energizes or charges it and then scans his biometric information using the card. Microprocessor 120 will store the scanned biometric information if it passes preset criteria. Once the biometric information is accepted, the user now can activate the card by again scanning the biometric information. If the biometric information matches the identity biometric information, an identity authorization code is issued. The identity authorization code can then be sent to the issuing organization or entity, thus informing the issuing organization or entity that the smart card is activated and ready for use.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A biometric smart card for biometric identification or authorization of a user, the biometric smart card comprising
   a substrate, wherein the substrate is transparent to biometric information and has a Young's modulus of at least 50 GPa and a thickness of up to about 0.5 mm, and wherein the substrate forms a first outer surface of the biometric smart card;
   a protective cover, the protective cover forming a second outer surface of the biometric smart card opposite the first surface
   a biometric sensor, wherein the biometric sensor is disposed flush with the first outer surface or between the first outer surface and the protective cover and adjacent to the substrate such that the biometric sensor receives the biometric information through the substrate;
   a microprocessor in communication with the biometric sensor, wherein the microprocessor is disposed between the transparent substrate and the protective cover, and wherein the microprocessor authenticates or identifies the user based upon the biometric information received by the biometric sensor; and
   a power management system in communication with the biometric sensor and the microprocessor, wherein the power management system provides power to the biometric sensor and the microprocessor.

2. The biometric smart card of claim 1, wherein the substrate comprises a metal, an alloy, a composite material, a transparent material, or combinations thereof.

3. The biometric smart card of claim 2, wherein the transparent material comprises one of a soda lime glass, a borosilicate glass, an alkali aluminosilicate glass, and an alkali aluminoborosilicate glass.

4. The biometric smart card of claim 3, wherein the glass is strengthened and has layer extending from a surface of the glass to a depth of layer in the glass, and wherein the is under a compressive stress.

5. The biometric smart card of claim 4, wherein the compressive stress is at least about 300 MPa, and the depth of layer is at least about 10 µm.

6. The biometric smart card of claim 2, wherein the transparent material further includes indicia printed on a second surface of the transparent material, wherein the second surface is opposite the outer surface.

7. The biometric smart card of claim 2, further comprising a passive display disposed on the substrate and readable through the first outer surface.

8. The biometric smart card of claim 1, wherein the biometric information comprises at least one of a capacitance signal and an optical signal.

9. The biometric smart card of claim 1, wherein the power management system comprises at least one of a power source and an energy storage device.

10. The biometric smart card of claim 9, wherein at least a portion of the power management system is disposed between the substrate and the protective cover.

11. The biometric smart card of claim 9, wherein the power source comprises a power mat or a charger in communication with and external to the biometric smart card.

12. The biometric smart card of claim 9, wherein the power source comprises at least one of a radio frequency power source, an inductive layer, and a photo-electric layer.

13. The biometric smart card of claim 9, wherein the energy storage device comprises at least one of a capacitor and a battery.

14. The biometric smart card of claim 13, wherein the battery is rechargeable.

15. The biometric smart card of claim 1, wherein the biometric sensor is one of a capacitive sensor and a visual sensor.

16. The biometric smart card of claim 1, wherein the biometric information is fingerprint-based or iris pattern-based.

17. The biometric smart card of claim 1, wherein the biometric smart card is self-authenticating.

18. The biometric smart card of claim 1, further including a reader interface, wherein the reader interface is in communication with the microprocessor and transfers data from the microprocessor to an external data processor or data storage unit.

19. The biometric smart card of claim 18, wherein the reader interface comprises a magnetic strip disposed on the second outer surface of the biometric smart card.

20. The biometric smart card of claim 18, wherein the reader interface comprises a wireless communicator.

21. A biometric smart card for biometric identification or authorization of a user, the biometric smart card comprising:
a transparent substrate, wherein the transparent substrate is transparent to biometric information and has a Young's modulus of at least 50 GPa and a thickness of up to about 0.5 mm, and wherein the transparent substrate forms a first outer surface of the biometric smart card;
a protective cover, the protective cover forming a second outer surface of the biometric smart card opposite the first surface
a biometric sensor, wherein the biometric sensor is disposed flush to the first outer surface or between the first outer surface and the protective cover and adjacent to the transparent substrate such that the biometric sensor receives the biometric information through the substrate;
a microprocessor in communication with the biometric sensor, wherein the microprocessor is disposed between the transparent substrate and the protective cover, and wherein the microprocessor authenticates or identifies the user based upon the biometric information received by the biometric sensor; and
a power management system in communication with the biometric sensor and the microprocessor, wherein the power management system provides power to the biometric sensor and the microprocessor.

22. The biometric smart card of claim 21, wherein the transparent substrate comprises one of a soda lime glass, a borosilicate glass, an alkali aluminosilicate glass, and an alkali aluminoborosilicate glass.

23. The biometric smart card of claim 22, wherein the glass is strengthened and has layer extending from a surface of the glass to a depth of layer in the glass, and wherein the is under a compressive stress.

24. The biometric smart card of claim 23, wherein the compressive stress is at least about 300 MPa, and the depth of layer is at least about 10 µm.

25. A method of using a smart card, the method comprising:
providing the smart card, wherein the smart card comprises:
a substrate, wherein the substrate is transparent to biometric information and forms a first outer surface of the smart card, and wherein the substrate has a Young's modulus of at least 50 GPa and a thickness of up to about 0.5 mm;
a protective cover, the protective cover forming a second outer surface of the smart card opposite the first outer surface;
a biometric sensor disposed between the first outer surface and the protective cover such that the biometric sensor receives the biometric information through the substrate; and
a microprocessor in communication with the biometric sensor and disposed between the substrate and the protective cover;
scanning the biometric information with the biometric sensor; and
comparing the scanned biometric information with biometric information stored in the microprocessor.

26. The method of claim 25, further comprising one of authorizing a transaction and denying authorization of a transaction.

27. The method of claim 26, wherein authorizing or denying authorization comprises generating a time-sensitive code and comparing the time-sensitive code to an issued code issued by an issuing entity, wherein the transaction is authorized if the time-sensitive code matches the issued code or denied if the time-sensitive code differs from the issued code.

28. The method of claim 25, wherein the substrate comprises a metal, an alloy, a transparent material, or combinations thereof.

29. The method of claim 25, wherein the transparent material comprises one of a soda lime glass, a borosilicate glass, an alkali aluminosilicate glass, and an alkali aluminoborosilicate glass.

30. The method of claim 25, wherein the transparent material is strengthened and has layer extending from a surface of the transparent glass substrate to a depth of layer in the glass, and wherein the is under a compressive stress.

31. The method of claim 30, wherein the compressive stress is at least 300 MPa, and the depth of layer is at least 10 µm.

\* \* \* \* \*